United States Patent Office 3,338,027
Patented Aug. 29, 1967

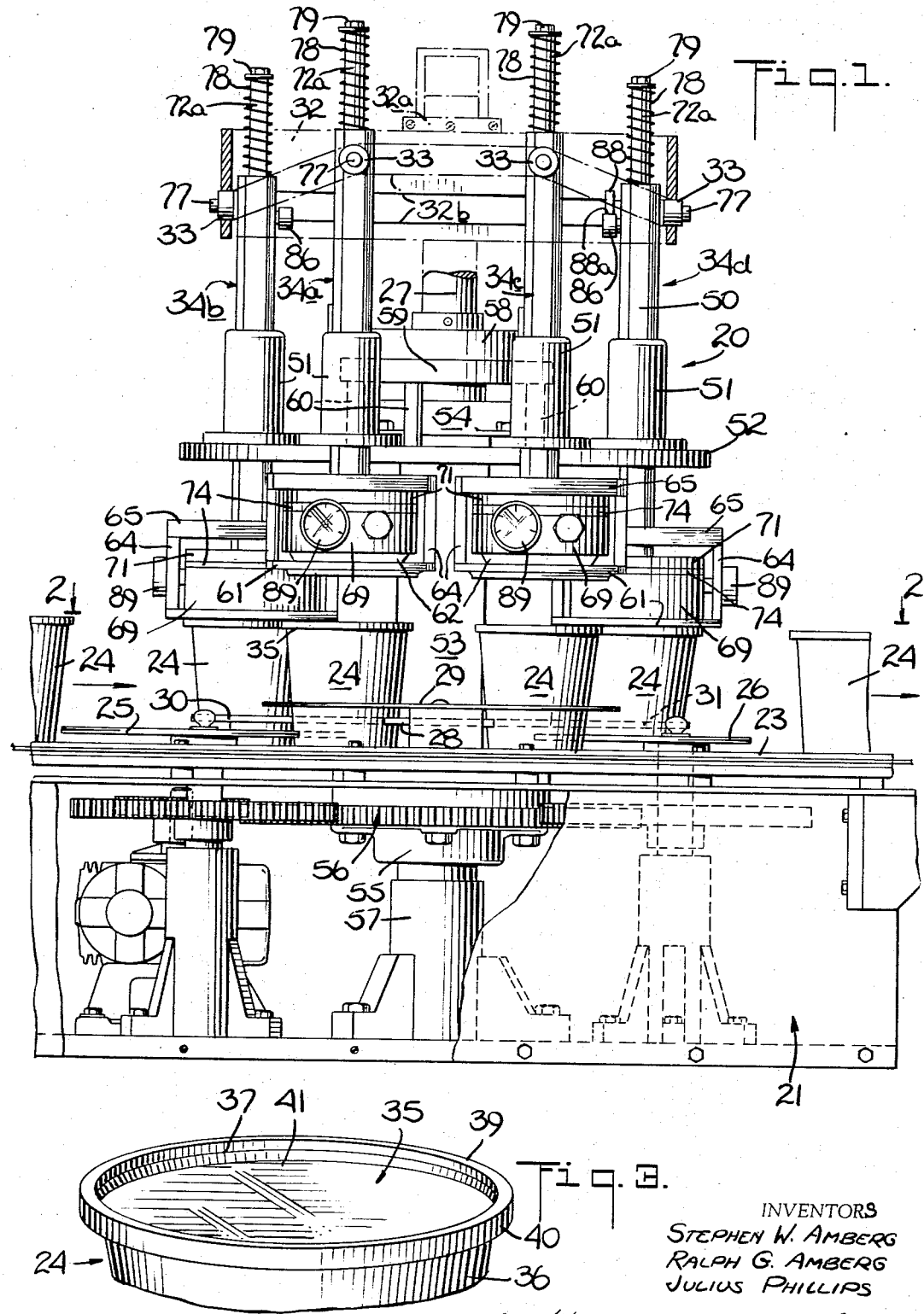

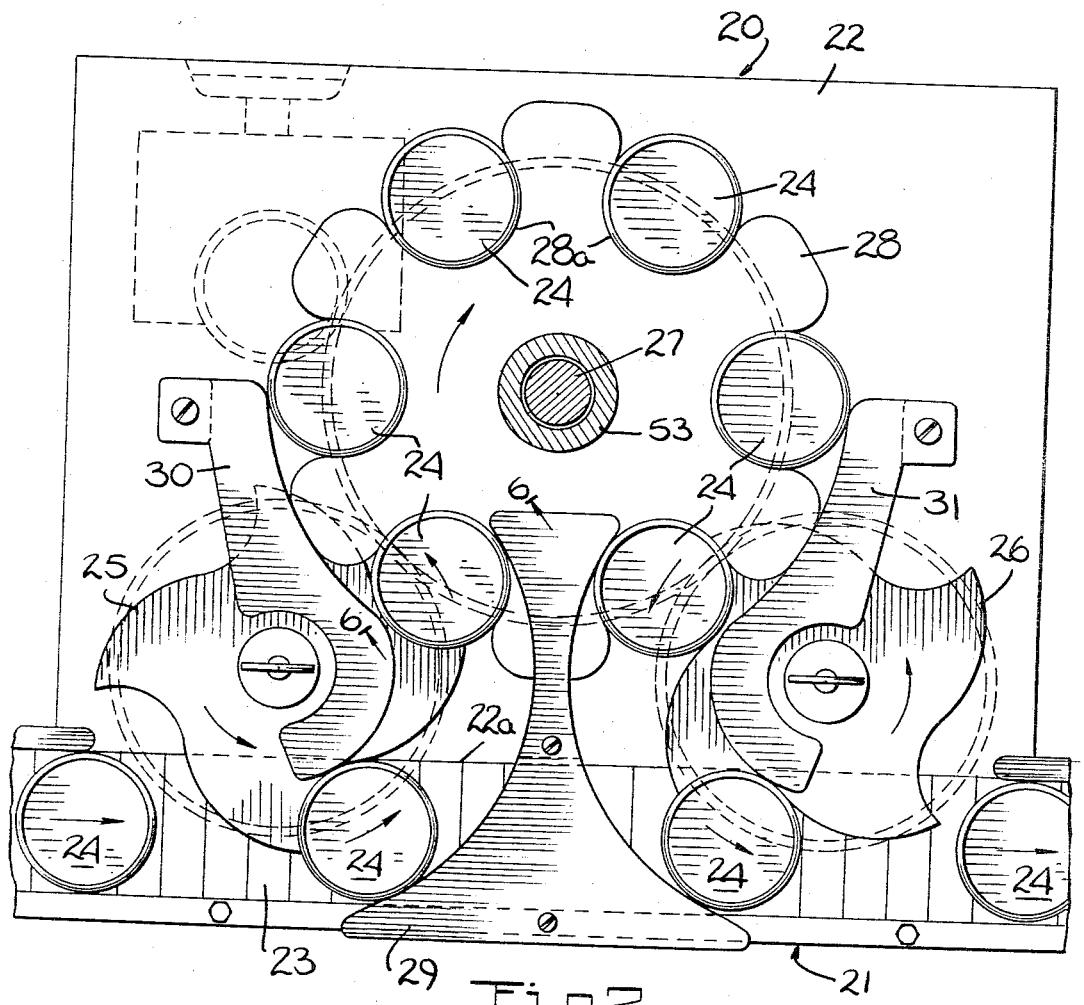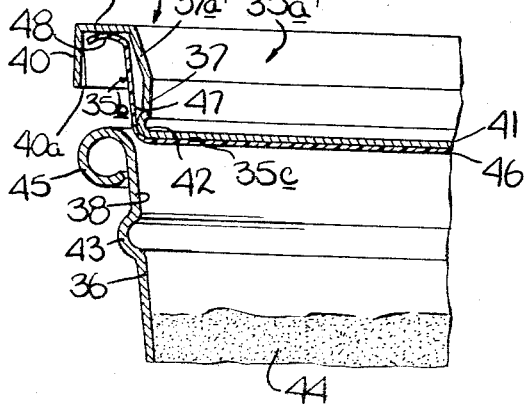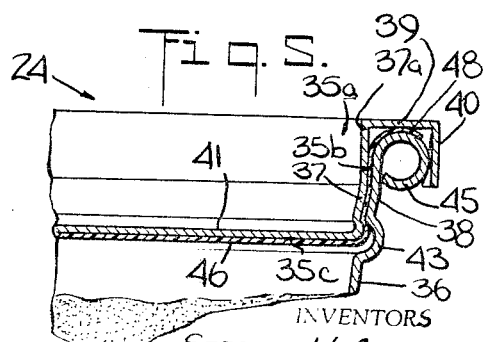

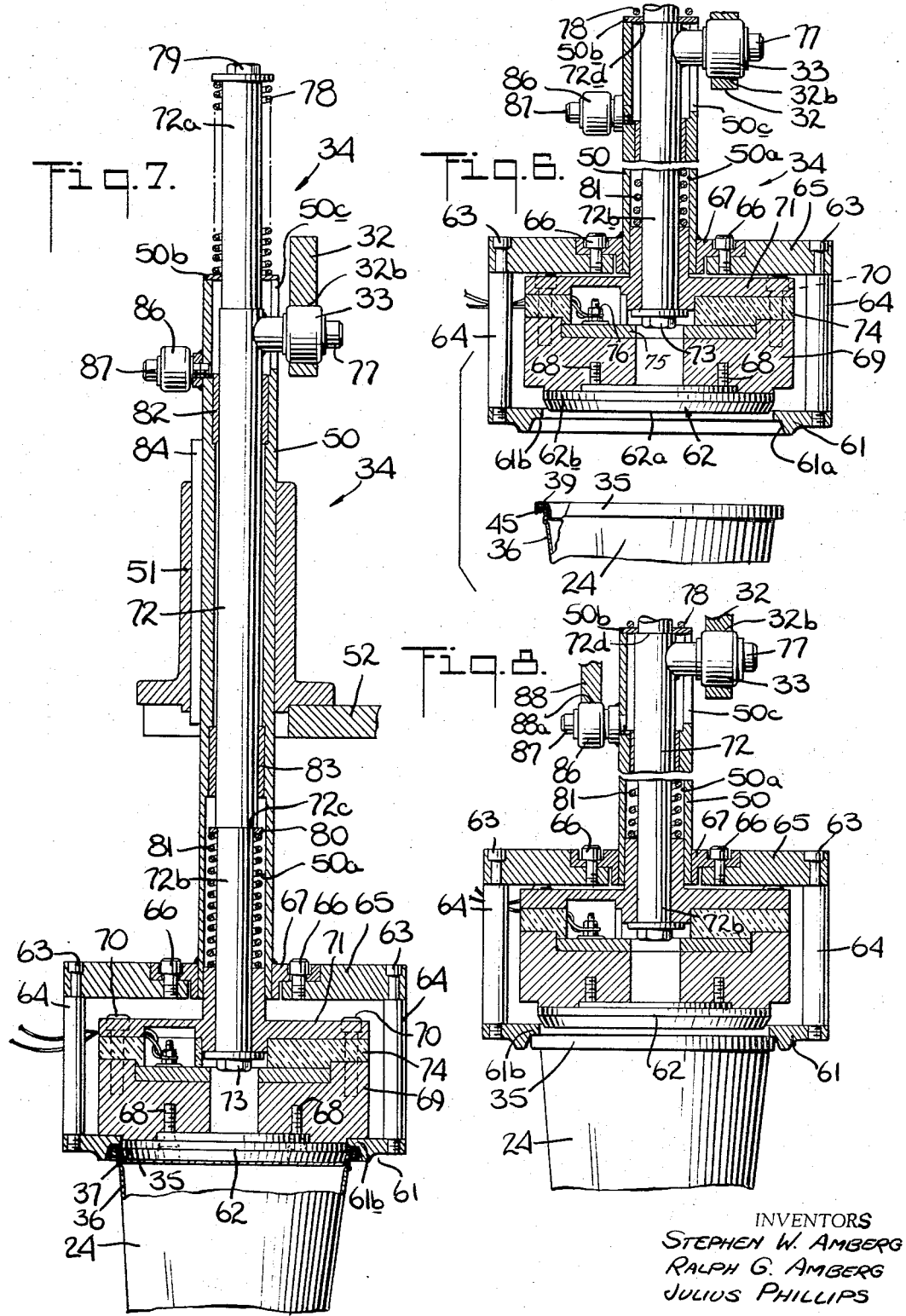

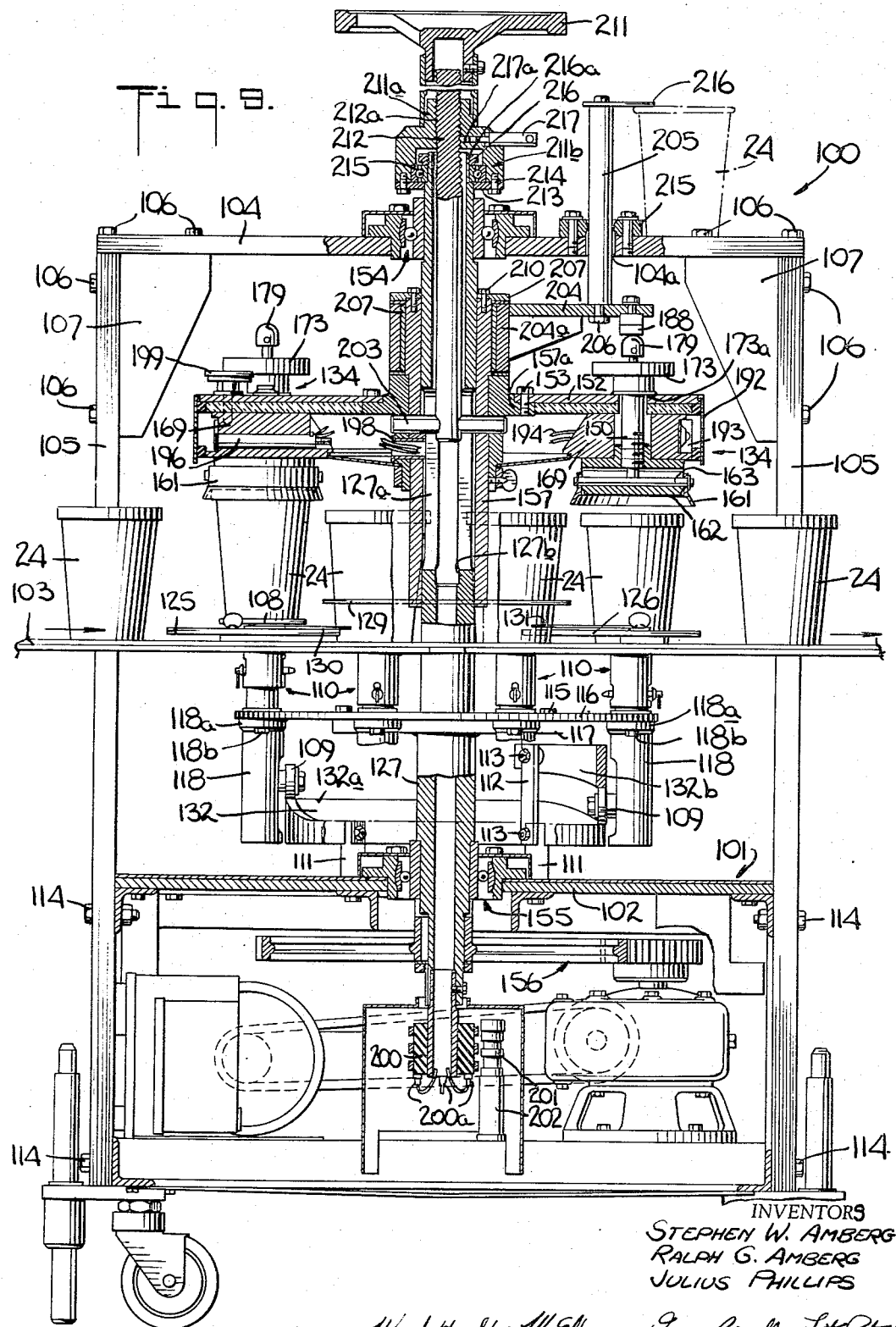

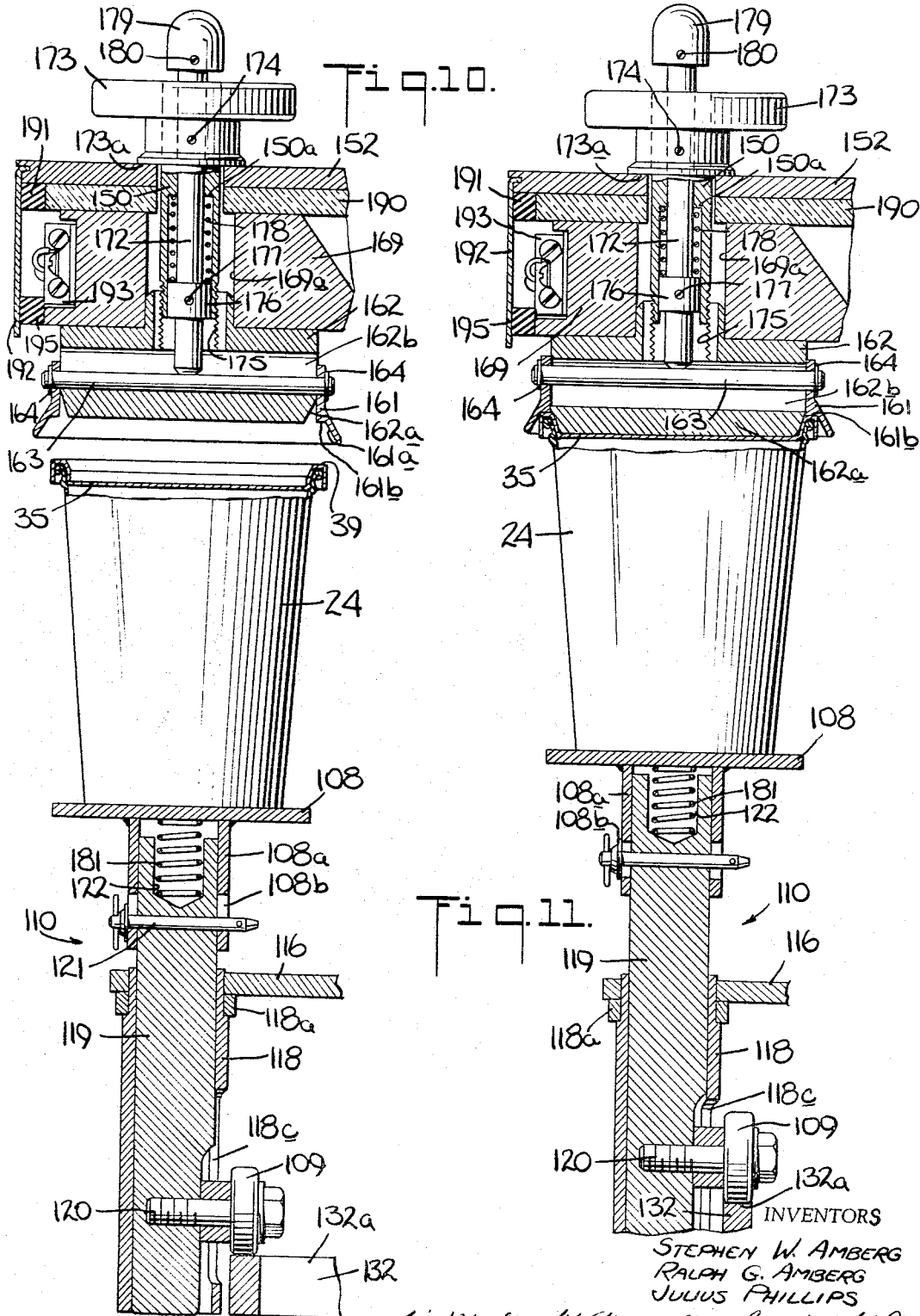

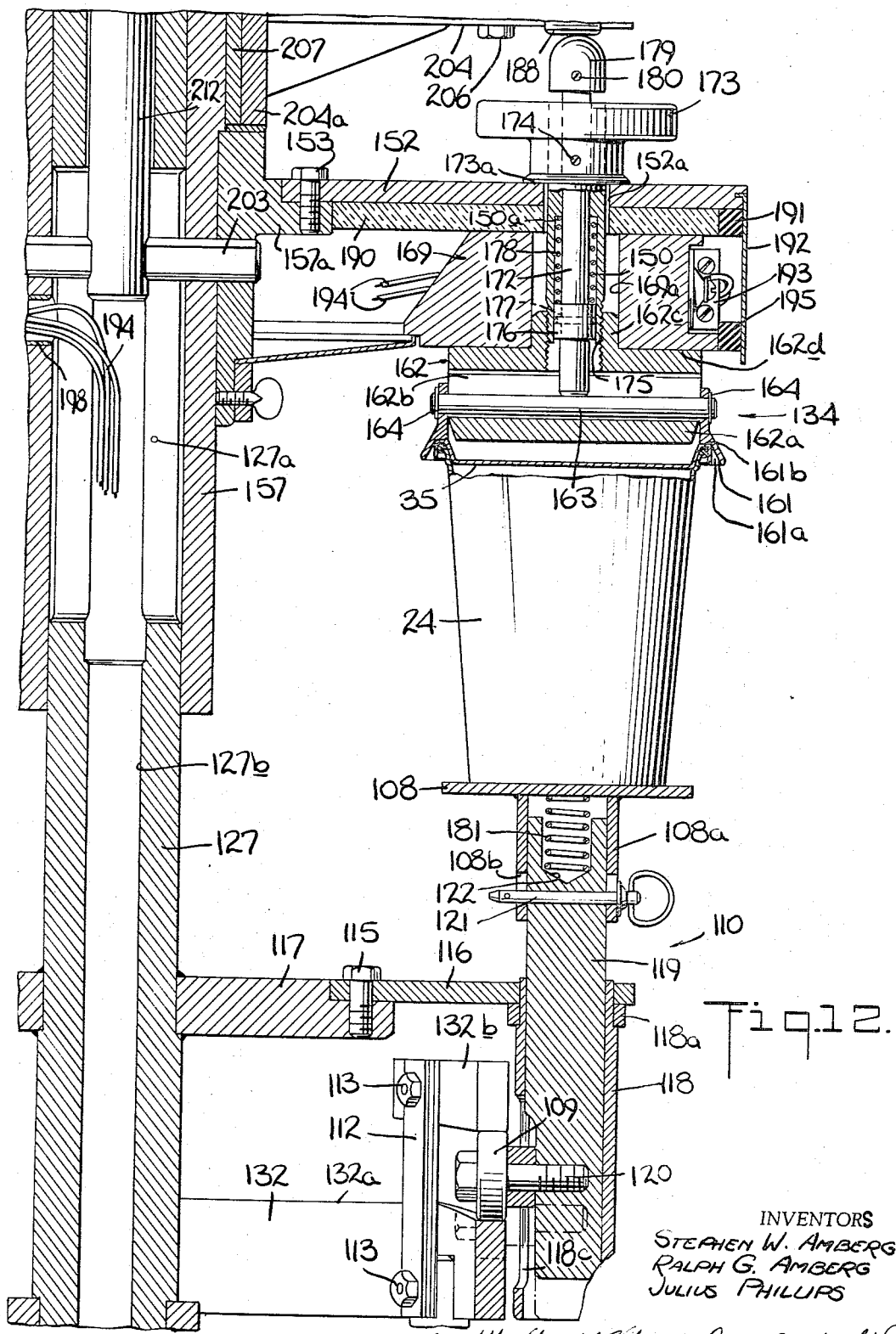

3,338,027
CONTAINER SEALING APPARATUS
Stephen W. Amberg, St. James, N.Y., Ralph G. Amberg, Monticello, Ind., and Julius Phillips, Bronx, N.Y., assignors to Lily-Tulip Cup Corporation, New York, N.Y., a corporation of Delaware
Filed Mar. 11, 1965, Ser. No. 438,945
21 Claims. (Cl. 53—341)

This invention relates to the sealing of lids on to receptacles, which have been filled with comestibles or the like, to form sealed containers in which the goods are sold. More particularly, the invention relates to machines and methods which may be used for the purpose.

Although the invention may have other uses, it was made during attempts to achieve rapid and effective production-line sealing of the container and lid described and claimed in copending application Ser. No. 349,071, filed Mar. 3, 1964, now Patent No. 3,301,464. Accordingly, the invention will be described in connection with such use.

As more fully described in the referred to application, such a container is formed by a receptacle part of wax-coated or wax-impregnated paper or of plastic, and a lid which is sealed on to the receptacle part to provide an air- and liquid-tight package for the cottage cheese, butter, fruit salad or other items, either edible or not, which the receptacle part contains. In particular, the lid shown and described in that application is a "plug type" lid, as distinguished from a "flush type" lid, and incorporates what is referred to as a "two-piece construction" formed by an inner closure and an outer closure which are temporarily connected together. The inner closure, which may be made of a sheet of cellophane, metal foil, paper, polypropylene, polyethylene or the like and having a heat sensitive adhesive disposed on its outwardly facing surface, is temporarily attached by a few spots of wax to the outer closure which may be made of paper or, preferably, of polystyrene or other plastic material. When the receptacle part has been capped, only the inner closure will be heat sealed to the interior surface of the receptacle at its mouth rim, whereas the outer, snap-on type closure will not be sealed or crimped or otherwise secured to the receptacle part. When opening the sealed container, the outer closure may be conveniently removed and subsequently reused to cover the receptacle part without mutilation of the same, whereas the inner closure must be torn away from the receptacle part to which it has been attached.

Although the invention in its broader aspects may also be usable or adaptable for use in sealing lids of conventional one-piece construction onto containers, or for use in sealing lids on to receptacles where a pressure sensitive adhesive at room temperature is employed as the sealing agent, the present invention particularly contemplates a machine and method which is usable to heat seal lids, such as the two-piece lid above described, on to receptacles. Moreover, and although the invention may be useful in instances where the heat sensitive adhesive is heated and rendered adherent or partially adherent prior to the lid being placed upon the receptacle, it is contemplated that the machine and method to be described will be capable of forming an effective heat seal between the lid and receptacle part after the lid is in place on the receptacle part, and where both the lid and the receptacle are initially at room temperature, or nearly room temperature.

The present invention provides a method and means for effecting an air-tight and liquid-tight heat seal between the lid and the receptacle part of a container in an efficient and economical manner. Further, the apparatus is intended to be adaptable for relatively high speed, repetitive sealing operations as would be necessary in food processing and packaging plants where production line techniques are employed.

A difficulty in heat sealing a plug-type lid to a receptacle where the lid has already been placed thereon involves the problem of attaining adequate and uniform heat penetration to the unexposed interface between the lid and receptacle at which the heat must be applied in order to condition the heat sensitive adhesive for adhesively securing the parts together. This is especially true in the case of production capping operations where the lids must be sealed rapidly, and therefore the heat penetration must be attained within a relatively short period of time.

In addition, the effects of the heat on the basic materials from which the lid and receptacle part are made must be considered, as well as the configuration of especially the lid, since another difficulty encountered is the problem of heat distortion of the container elements when the sealing heat is applied.

Accordingly, the present invention provides a method and apparatus for heat sealing a lid on to a receptacle part by the application of adequate and uniform heat through the peripheral wall of the lid element in a manner adaptable for use in high speed repetitive lid sealing operations. The invention incorporates lid hold-down and release features, as will be described, for the purpose of assuring the forming of a good seal without distortion of either the lid or receptacle part during the sealing operation.

Briefly describing the apparatus of the invention, receptacles having lids initially placed but not yet sealed thereon are sequentially fed into a turret type sealing machine having a plurality of non-rotating, annularly spaced apart and heated sealing discs which revolve about the central axis of the machine. In one embodiment, each sealing disc is mounted on a sealing head which has vertical reciprocal movement by cam action responsive to a revolution of the machine. Each of the sealing discs is separately employed to seal the lid on to the capped receptacle which is positioned thereunder, the receptacle moving with the sealing discs as the machine rotates. Thus, during a revolution of the machine, each non-rotating sealing disc will be lowered into pressure engagement with the lid of that container with which the disc is associated, and thereafter lifted to permit discharge of the then fully sealed container. In another embodiment, the receptacles are placed upon vertically movable receptacle supports which, while revolving with the machine, elevate the receptacles respectively into engagement with an associated sealing disc which is mounted on a sealing head which moves concurrently about the machine with the receptacle in response to machine rotation. After sealing has occurred within one revolution of the machine, the fully sealed container is lowered away from the sealing disc and discharged from the machine. Excepting for this variation, the general manner of operation of the several embodiments of the machine are similar so that the subsequent continued brief description thereof is applicable to any of them.

Each of the sealing discs is heated to a temperature of between 230° F. and 350° F., depending upon machine speed, and upon the materials from which the receptacle part and the lid are made. In this connection, a particular feature of the machine in an alternative embodiment is the manner in which the sealing discs are adequately and uniformly heated for the purpose.

Each disc is in sealing engagement with the lid of its associated container for only a brief period of from two to ten seconds. The arrangement is such that each sealing disc exerts a downward force of from 60 to 80 pounds on the container with which it is associated. Prior to, during, and immediately after this period, a lid hold down element of the sealing head is in firm engagement with the top wall of the lid, which is that portion of the lid which spans across the conventional beaded rim of the receptacle part, and exerts a lid hold down force of from 10 to 20 pounds thereon. Such pressure on the lid rim prevents the outer closure portion of the lid from distorting or shrinking away from the beaded rim of the receptacle part as might otherwise occur under the influence of the heat or pressure of the sealing disc.

Further, after the sealing has been effectuated, and in the event proper separation of the sealing disc and the now sealed container lid does not immediately occur, a safety stripper feature of the machine assures that the container will be freed from the sealing disc to be properly discharged from the machine.

In its preferred embodiment, the machine provided by the invention is capable of sealing lids on to their respective receptacles at rates higher than sixty (60) per minute.

These and other objects, features and advantages of the invention will be apparent from the following detailed description thereof, when taken with reference to the accompanying drawings in which:

FIGURE 1 is a front elevation of a machine in accordance with the invention, certain of its parts being omitted, and others being fragmented for clarity;

FIGURE 2 is a plan view in cross section of the machine of FIGURE 1, the view being taken at lines 2—2 of FIGURE 1;

FIGURE 3 is a fragmentary and enlarged perspective showing of a container which has been sealed in accordance with the invention;

FIGURE 4 is an enlarged fragmentary cross-sectional showing of a lid being applied to a receptacle to form a container assembly to be sealed in accordance with the invention, and FIGURE 5 is a similar showing of the same container assembly after having been sealed in accordance with the invention;

FIGURES 6–8, inclusive, are enlarged cross-sectional views of one of the sealing heads of the machine of FIGURE 1, the views being fragmentary in part and indicating the sequence of operation of the sealing head as well as the details of its construction;

FIGURE 9 is a fragmentary cross-sectional elevation of a modified form of machine in accordance with the invention; and FIGURES 10–12 are enlarged fragmentary cross-sectional showings of one of the sealing heads and its associated receptacle transport head of the machine of FIGURE 9, the views being for the purpose of illustrating the sequence of operation of the parts as well as the details of their construction.

Referring now to the drawings, the general overall arrangement of a machine in accordance with the invention is illustrated in FIGURES 1 and 2 in connection with one embodiment thereof which is generally designated by reference numeral 20. Referring particularly to FIGURE 2, the machine 20 has a base frame 21 which houses certain conventional drive mechanisms which, though not fully illustrated or described, will be apparent to those having skill in the art upon an understanding of the necessary functions of such drive mechanisms causing proper operation of the machine in the manner as will be explained. The base frame 21 includes a flat table 22 along the front edge 22a of which, and at the same elevation, there is mounted a movable conveyor 23 for transporting the previously capped but as yet unsealed containers 24 into the machine for final sealing of the lids thereon. The conveyor 23 as illustrated is a plate type, but may be a belt type or other conventional conveyor which is suitable for the purpose. The base frame 21 also mounts a rotatable infeed star wheel 25 and an outfeed star wheel 26, these being positioned and driven in the direction of the arrows as shown in FIGURE 2 by suitable drive mechanisms within the base frame 21. Mounted for rotation on a fixed vertical shaft 27 of the base frame is a receptacle transport star wheel 28 which has a plurality of annularly spaced apart receptacle receiving grooves 28a for positioning and carrying the capped containers 24 during the lid sealing operation which is performed by the machine. The base frame 21 also includes suitable fixed guides 29, 30 and 31 for guiding the containers 24 upon entering and leaving the sealing machine as will be apparent from the drawings. The conveyor 23 is driven in the direction indicated in FIGURE 2 by mechanisms within the base frame 21, and it will be noted that its speed is in timed relation with that of the infeed and outfeed star wheels 25, 26 for the purpose of moving the containers 24 smoothly into and out from the machine.

Referring now to FIGURE 1, a cam 32 is adjustably attached, as by the collar 32a and associated screws thereof, in fixed position at a location near the upper end of the fixed vertical shaft 27 of the machine. The adjustable elevation of the cam 32 adapts the machine to receive containers of a variety of heights, as may be desired. The annularly extending cam track 32b thereof guides and determines the vertical movement of each of a plurality of annularly spaced apart and vertically extending sealing heads, generally indicated by reference numeral 34, by the engagement therewith of the respective cam follower rollers 33 of the sealing heads. In this connection, and as will be more fully explained, each sealing head 34 does not itself rotate, but all of the same revolve about the shaft 27 responsive to machine rotation. Moreover, each sealing head 34 is aligned above and moves with one of the receptacle receiving grooves 28a of the receptacle transport star wheel 28 by means which will be presently described.

In the embodiment of the invention being described the machine has six identical sealing heads 34 (see FIGURE 2), but it will be understood that the machine 20 may be adapted to carry a greater or fewer number of sealing heads depending upon the machine rate of production desired, the latter in turn being dependent upon machine speed and the necessary time for sealing each container 24 as will be subsequently described. Thus, and in general, upon consideration of the pattern of the cam track 32b, as indicated by the dotted line (front of the machine) and full line (rear of the machine) showing, and the respective annular locations of the several sealing heads 34 as illustrated in FIGURE 1 (only four sealing heads being shown therein for clarity), it will be understood that each sealing head 34 is vertically movable during rotation of the machine 20 from an upper position thereof as indicated by the sealing head designated 34a located at the front of the machine as shown at the left hand side of FIGURE 1, to a lowered position thereof as indicated by the sealing head designated 34b, and thence again to its initial upper position as indicated by the sealing head designated 34c at the right hand side of FIGURE 1, each sealing head 34 remaining in its lowered position during its course of travel from its annular location as indicated by numeral 34b to its location as indicated by numeral 34d at the right hand side of the drawing.

Before continuing with the detailed description of the machine and method of the invention, it should first be noted that its function is to seal a lid 35 on to a receptacle part 36 to fully seal the container assembly 24, as illustrated in FIGURES 3 and 5. As shown by FIGURE 4, the particular lid 35 which the invention is adapted to seal on to the receptacle part 36 has so-called "two-piece" construction, the same being formed by an outer closure 35a and an inner closure 35b. The inner and outer closures 35a, 35b are temporarily connected together, as by a few annularly disposed spots of wax 35c therebetween, prior to the time when the lid 35 is placed on the receptacle part 36. As more fully described in the aforementioned copending application, the lid 35 is of the "plug" type, as distinguished from a "flush" type as those terms are commonly employed in the trade, its outer closure 35a being made of polystyrene plastic material and having a substantially vertical and peripherally extending wall 37 which will lie in cofacing relationship with respect to the interior surface presented by the wall portion 38 of the receptacle part 36 when the lid is placed on the latter. Actually, the receptacle wall 38 is conically tapered in conventional manner as shown, and the lid wall 37 includes a conically tapered upper portion 37a having a somewhat more pronounced taper as indicated in FIGURE 4. At the upper end of the peripheral wall 37 the outer closure 35a has a radially outward projecting top wall 39 having a depending peripheral skirt 40. At the lower end of the vertical peripheral wall 37, where the same joins with the flat central area 41 of the lid, the outer closure 35a includes an annularly extending and radially outward projecting lid-locking bead 42 which snaps into the similar lid-locking bead 43 of the receptacle part 36. If desired, the lid-locking bead elements 42 and 43 may be eliminated as, for example, where the contents 44 (FIGURES 4 and 5) of the container are not such as to develop internal gas pressures, or for other reasons. The top wall 39 and peripheral skirt 40 of the outer closure 35a snap over and envelop the conventional beaded mouth rim 45 of the receptacle part 36 when the lid is in place, the peripheral skirt 40 having radially inward projecting corrugations 40a or an inwardly projecting and annularly extending bead (not illustrated) or similar construction at its lower end to provide the snap on engagement. The receptacle part 36 is made of wax coated paper material.

The inner closure 35b of the lid 35 is formed from a flat sheet of flexible material, such as polyethylene or polypropylene plastic or cellophane or metal foil or the like, which is folded in conforming relation with the under surface portions of the outer closure 35a, as illustrated in FIGURE 4. Thus, the inner closure 35b may be considered as having a disc-like central portion 46 which lies adjacent to the central portion 41 of the outer closure; an upwardly turned peripheral wall 47 which lies adjacent to the outer closure wall 37; and a radially outward projecting peripheral lip 48 which underlies the outer closure top wall 39. In the initially manufactured condition of the lid 35, the upwardly turned peripheral wall 47 and the lip 48 of the inner closure will be pleated as necessary to cause the inner closure 35b to form around the under surface of the outer closure 35a as shown. Further, and although not identified by reference numeral, it will be understood that the flexible material which forms the inner closure 35b is either coated or laminated with a heat sensitive adhesive material at least along its area which forms the outer, or receptacle part facing surface of its upwardly turned peripheral wall 47. It will be further understood that the base materials from which both the inner and outer closures 35a, 35b are respectively made are heat conductive materials since it is intended by the present invention that heat will be transmitted therethrough in rendering the heat sensitive coating of the inner closure, disposed on the opposite side thereof, to a tacky or adhesive condition. As previously mentioned, the inner and outer closure elements of the lid 35 are tacked together by a plurality of wax spots 35c, as clearly indicated in FIGURE 4.

The lid 35 is placed on the receptacle part 36, as indicated by the arrow in FIGURE 4, prior to the time when the thus closed container 24 is sealed in accordance with the present invention. That is, in separate operations which precede the movement of the capped container 24 into the sealing machine of the invention, the receptacle part 36 has been filled with its contents 44 and the lid 35 has been placed thereon either by hand or in a separate automatic capping operation. Ordinarily, the lid 35 will be pressed down upon the receptacle part 36 to the point where their respective lid locking beads 42, 43 engage each other, but it should be noted that accurate seating of the lid 35 during the capping operation is not a necessary prerequisite for the container to be properly sealed in a machine in accordance with the present invention.

Briefly referring to FIGURE 5 which is a fragmentary cross-sectional showing of a container 24 having a lid 35 sealed on to a receptacle part 36 in accordance with the present invention, it will be noted that only the inner closure 35b has been heat sealed to the interior wall portion 38 of the receptacle part 36 so that the outer closure 35a may be conveniently removed without breaking the seal formed by the inner closure 35b. Further, and in accordance with the preferred embodiment, the outwardly projecting peripheral lip 48 of the inner closure 35b is not heat sealed to the beaded mouth rim 45 of the receptacle part during the sealing operation, but is free to be lifted by the fingers and employed as a peripherally etxending tear tab for severing the seal and tearing off the inner closure 35b after the outer closure 35a has been removed. As pointed out in the referred to copending application, after the inner closure 35b has been removed, the outer closure 35a may be used by the housewife for recapping the receptacle part 36 to preserve any unused portion of the contents 44 of the container.

It will also be noted from FIGURE 5 that as a result of the lid sealing operation in its preferred embodiment as will be described, the vertical wall portion 37 of the outer closure and the cofacing wall portion 38 of the receptacle part are slightly distorted in radially outward direction to insure a close fitting, snap-on relationship between outer closure 35a and the receptacle part 36, as well as for assisting in forming a tight adhesive seal between the inner closure 35b and the receptacle part wall portion 38 during and immediately after the sealing operation. In this connection, it is thought that such outward distortion imparts a degree of radially inward directed resiliency of the receptacle part wall portion 38 and, in effect, a somewhat buttressed and thus more rigid vertical peripheral wall 37 of the outer closure 35a against which such resiliency of the receptacle part wall portion 38 may act.

Referring again to the details and operation of the sealing machine 20, and as previously explained, the capped but unsealed containers 24 are placed on the moving conveyor 23 as indicated at the left hand side of FIGURES 1 and 2, and are transferred into the machine by the rotating infeed star wheel 25. Each container 24 is received by one of the receptacle receiving grooves 28a of the synchronously rotating star wheel 28. Within one revolution of the star wheel 28 the container 24 is sealed, and thereafter is returned to the conveyor 23 by the action of the synchronously rotating outfeed star wheel 26 so that the now fully sealed container is transported away from the machine, as indicated at the right hand side of FIGURES 1 and 2.

Referring to FIGURE 1, and as previously mentioned, one of the individual sealing heads 34 is mounted over and in alignment with each of the respective receptacle receiving grooves 28a, and all of the sealing heads 34 revolve about the fixed central shaft 27 of the machine concurrently with the rotation and the star wheel 28. Each sealing head 34 has a hollow and elongated outer shaft 50 having hexagonal shape at its outer surface to prevent rotative movement thereof. The shaft 50 is mounted for vertical slidable movement within a vertically disposed and fixed slide bearing 51, having corresponding hexagonal shape, of a rotatable sealing head support plate 52 through which the sealing head 34 also extends.

To afford the concurrent rotative movement of the sealing head support plate 52 and the receptacle transport star wheel 28, both are attached, as by welding or the like, adjacent the respective upper and lower ends of a rotatable shaft 53 which spaces the two apart, and which is sleeved around the fixed central shaft 27 of the machine. Roller type journal bearings, which are disposed within the respective journal bearing housings 54 and 55 at the opposite ends of the shaft 53, insure free rotative movement thereof responsive to drive mechanisms, generally indicated by reference numeral 56, within the base frame 21. A suitable lower end thrust bearing 57 supports the rotatable shaft 53 within the base frame 21, and upward thrust thereof is guarded against by a thrust plate 58 which is attached to the fixed shaft 27 at a location above the upper end of the shaft 53, as indicated in FIGURE 1. The horizontal plate 59 which is attached to the sealing head support plate 52 (as by bolts and spacers 60) is in cofacing relationship with the underside of the fixed thrust plate 58 to present an enlarged area for the purpose.

The details and operation of each of the several sealing heads 34 will now be explained with reference to FIGURES 6–8, inclusive.

Referring first to FIGURE 6 wherein one of the sealing heads 34 is shown in its upper position prior to its downward movement to seal the lid 35 on to the receptacle part 36 of the container assembly 24 therebelow, it is seen that the sealing head comprises a lid hold down element 61 and a sealing disc element 62 which are vertically movable relative to each other. In the machine 20 being described, the lid hold down element is a horizontally disposed disc-shaped plate having a central aperture (not numbered) for pasage of the disc element 62 therethrough, and further having an upwardly recessed portion 61a of its underside surface for accommodating the outer periphery of the lid 35 of the container to be sealed. The upwardly recessed portion 61a includes a horizontally disposed and downwardly facing flat surface 61b for downward pressure engagement with the top wall 39 of the lid during the sealing operation. This lid hold down element 61 is supported by a frame-like structure formed by the vertically extending bolts 63 and spacers 64 and the horizontal frameplate 65 to which the bolts 63 are attached. The frameplate 65 is in turn attached, as by cap screws 66, to an outwardly projecting flange 67 of the hexagonally shaped vertical shaft 50 of the sealing head, the shaft 50 being press fit and welded to the flange element 67. The hold down element 61 is made of aluminum.

The sealing disc 62 is attached, as by bolts 68, to a disc shaped block 69 of heat conductive material, which in the prefered embodiment is aluminum. The sealing disc 62 itself is of heat conductive material, preferably aluminum, and the configuration of its vertically disposed peripheral wall includes a radially inward and downward conically tapered lower portion 62a and a vertically extending cylindrical upper wall portion 62b thereabove as shown. This configuration conforms to the desired ultimate shape of the vertical wall 37 of the outer closure as shown in FIGURE 5 and as previously explained. The heat conductive block 69 is attached, as by bolts 70, to a sealing disc support plate 71 which is journalled for vertical slidable movement within the hollow 50a of the hexagonal vertical shaft 50, the support 71 being also sleeved about and vertically slidable on an interiorly disposed inner vertical shaft 72 of the sealing head 34. A bolt and washer assembly 73 retains the support 71 on the shaft 72, as indicated. Insulating material 74 is disposed between the sealing disc support 71 and the heat conductive block 69. The sealing disc 62 is heated by an electrical heater 75, preferably of the disc shaped Chromalox type as shown, which is seated in a top recess of the heat conductive block 69. Electrical connections 76 to the heater 75 extend through the insulation 74 to an electrical source (not shown).

As perhaps best shown by FIGURE 7, the inner vertical shaft 72 provides the principal support for the sealing head 34, the shaft mounting the cam follower roller 33 which engages the cam track 32b of the fixed cam 32 of the machine. The cam follower roller 33 is mounted on a laterally projecting roller shaft 77 which is attached, as by welding or the like, to the inner vertical shaft 72 of the sealing head at a location spaced from its upper end as shown and it will be noted that, at its upper end, the hollow hexagonal shaft 50 has a vertically extending slot 50c for clearance of the roller shaft 77 and to permit relative vertical movement between the inner and outer sealing head shafts 72 and 50.

The inner shaft 72 has a smaller diameter upper portion 72a for mounting a coil spring 78 between the nut and washer arrangement 79 at its upper end and the inwardly turned flange or stop 50b at the upper end of the outer shaft 50. This spring 78 exerts its bias downwardly on the outer shaft stop 50b and determines the pressure of engagement of the lid hold down element 61 with the container lid in a maner as will be described. The tension of spring 78 and the preloading thereof is such that it exerts a lid hold down force of from 10 to 15 pounds on the container.

At the lower end of the inner shaft 72 there is another smaller diameter portion 72b which provides an interiorly disposed shoulder 72c for seating a spring retaining washer 80. A coil spring 81 is mounted between the washer 80 and the support plate 71, the spring 81 being initially set in depressed condition to exert from about 60 to 80 pounds of force in downward direction on the support plate 71. To facilitate the relative vertical slidable movement between the inner shaft 72 and the outer shaft 50, a pair of Oilite bushings 82, 83 are disposed at spaced apart locations along the central length of the shaft 72. Similarly, to facilitate the relative vertical slidable movement between the outer shaft 50 and the slide bearing 51, which is attached to the sealing head support plate 52 of the machine as aforesaid, an oil wick 84 is disposed therebetween for lubrication purposes.

For a purpose as will be explained, what is referred to as a "stripper" or "knock out" cam follower roller 86 is rotatably mounted on a roller shaft 87 which is attached, as by a threaded or welded attachment or the like, to the outer shaft 50 of the sealing head 34. Referring briefly to the right hand side of FIGURE 1, it will be noted that the cam follower roller 86 passes under and, under circumstances as will be explained, is in a position to engage the underside of a cam track 88a of a cam 88 which is attached in fixed position (by means not illustrated) within the circular cam 32 at a location corresponding to the location therealong of the initial part of the rise of the upward inclined portion of the cam track 32b which effects the lifting of the sealing head when at the location 34d after a sealing operation has been performed. The cam 88 has relatively short length so that the cam follower roller 86 cannot be engaged at any other time during machine operation.

The operation of the machine 20 and its respective sealing heads 34 will now be explained with particular reference to FIGURES 1 and 6–8. FIGURE 6 shows the disposition of the lid hold down element 61 and lid sealing element 62 relative to each other when sealing head 34 is at the location indicated by reference numeral 34a in FIGURE 1, whereat a container assembly 24 has already been moved into aligned position therebelow to be sealed. The receptacle transport star wheel 28 which has received and which will carry the container assembly 24 during the sealing operation, is continuously rotating, as is the sealing head support plate 52 which carries the plurality of sealing head 34. It will be noted that the sealing head 34a at this location is in its aforementioned upper position, its cam follower roller 33 being at the end of the 60° arcuate length of elevated straight track portion of the cam track 32b, one half of the straight track portion extending at either side of the machine center line at its front. Continued clockwise rotation of the plate 52 and star wheel 28 causes the sealing head to move vertically downward for sealing engagement with the lid 35 of the container assembly 24, the full engagement position of the sealing head being its lowered position as indicated by reference numeral 34b in FIGURE 1 and by FIGURE 7. This downward movement is caused by the travel of the follower roller 33 along the downwardly inclined length of the cam track 32b, which extends about 60° of the arcuate length of the cam track.

Comparing FIGURES 6 and 7, it will be noted that the spring 78 at the top of the inner shaft 72 of the sealing head initially biases the outer shaft 50 in downward direction and against the shoulder 72d of the inner shaft 72, at the lower end of its smaller diameter shaft portion 72a, so that the lid hold down element 61 is initially displaced to a position below the elevation of the lid sealing element 62 at a time prior to sealing engagement having been made between the sealing head 34 and the container assembly 24. Thus, during the downward movement of the sealing head, its lid hold down element 61 makes first contact with the lid 35 of the container to press its top wall portion 39 into firm engagement with the beaded mouth rim 45 of the receptacle part 36 of the container. The downwardly facing flat surface portion 61b of the lid hold down element effects the firm engagement with the top wall 39 of the container and, although by substitution of a spring having different tension or by changing the spring length the amount of hold down force may be altered, in one operable form of the invention the spring 78 exerts a downward force of ten (10) pounds on the rim of the container during its period of engagement therewith. The hold down engagement between the lid hold down element 61 and the container lid 35 is effected at a time prior to that when the cam follower roller 33 has reached the bottom of the aforementioned downward inclined portion of the cam track 32b, and it will be noted that the spring 78 will become depressed, as shown in FIGURE 7, as the roller 33 continues its downward movement.

The continued downward movement of the sealing head 34 as its roller 33 reaches the bottom of the incline causes the sealing element 62 to effect sealing engagement with the container lid 35, as illustrated in FIGURE 7, the shafts 50 and 72 moving relative to each other during this period. Considering FIGURE 7, it will be understood that the action of the cam track 32b on the roller 33 urges the inner shaft 72 downward, in a positive manner, to effect the engagement between the sealing element 62 and the container lid 35, but that the amount of force exerted by the sealing element 62 on the lid 35 is controlled by the tension and amount of preloading of the spring 81 which exerts its bias downwardly on the slidably mounted sealing disc support 71, as aforesaid. That is, whether or not the extent of downward movement of the shaft 72 is precisely controlled, the amount of force exerted by the sealing element 62 on the container lid 35 is fairly precisely controlled by the predetermined bias pressure of the spring 81, this for the reason that the support plate 71 to which the sealing element 62 is effectively attached, is free to slide upwardly on the shaft portion 72b responsive to the pressure of engagement between the sealing element 62 and the lid 35. With regard to controlling the amount of force exerted by the lid hold down element 61 on the lid top wall 39 during the sealing operation, it will be understood from FIGURE 7 that the same remains substantially constant for the reason that, during the aforesaid downward movement of the inner shaft 72, the outer shaft 50 is free to slide relative thereto and thereby to remain in relative stationary position at all times after the lid hold down element 61 has effected proper hold down engagement with the lid 35.

Sealing of the lid 35 on to the receptacle part 36 of the container assembly 24 occurs during approximately 180° of machine revolution, the sealing head 34 remaining in the position shown by FIGURE 7 during the time of travel of its roller 33 along the lower elevation straight length portion of the cam track 32b which extends along the rear of the machine as illustrated in FIGURE 1. As previously noted, the sealing by the machine 20 is achieved by the application of heat and pressure on what is referred to as the substantially vertical peripheral wall portion 37 of the lid 35, which actually has a slight sloping configuration as indicated in FIGURE 7. The amount of sealing pressure is predetermined and may be varied by substitution of springs of different tension for the spring 81, and by the extent of preloading of the same, as has been previously indicated. However, in one operable form of the invention, the tension and preloading of the spring 81 is such as to exert a downward force of 78 pounds on the lid, and it will be noted that this force is principally applied via the conically tapered portion 62a of the sealing element 62, the shape of this portion 62a and the portion 62b thereabove effecting the distortion of the lid and receptacle part as illustrated in FIGURE 5. The amount of heat applied to effect the sealing depends upon the rate of heat conduction of the materials of which the lid 35 is made, the softening point of the heat sensitive adhesive material which is used to effect the seal, and the speed of rotation of the machine 20. The temperature of the sealing element 62 is determined by the heater 75 mounted within the sealing head, and may be readily determined from the indication thereof appearing on the temperature gauge 89 (FIGURE 1) which is mounted on the sealing head 34. In this connection, and although not actually illustrated, it will be understood that the gauge 89 extends into and actually measures the temperature of the aluminum block 69 to which the sealing element 62 is attached.

The temperature of the sealing element 62 is set within a range of from about 230° to 350° F., depending upon the factors previously mentioned. As a specific example of the temperature to be used, however, where the receptacle part 36 of the container 24 is made of wax coated paper, and the outer closure 35a of the lid 35 is made of high impact polystyrene plastic material and, further, where the heat sensitive adhesive material is a wax-based material as disclosed in the aforementioned copending application, the temperature of the sealing element 62 as measured on the gauge 89 is set at 290° F. where the machine rate is such that sealing engagement between the sealing element 62 and the lid 35 is effected for a period of four seconds. If the receptacle part were coated or lined with polypropylene rather than being wax coated, then the temperature of the sealing element 62 should be about 350° F. using a sealing time of about five seconds. Accurate control of the electric current which heats the heater 75 is by conventional means, not illustrated. As previously noted, sealing will have been effected at the time when the sealing head 34 has reached the annular location on the machine as indicated by reference numeral 34d in FIGURE 1.

Referring now to FIGURE 8 which shows the relative positions of the sealing and hold down elements when the roller 33 of the sealing head 34 has climbed a short distance along the upwardly inclined, 60° arcuate length of the cam track 32b, it will be noted that such initial upward movement of the roller 33 has effected a lifting of the inner shaft 72 so as to disengage the sealing element 62 from the now sealed lid 35, yet the lid hold down element 61 still firmly engages the lid 35. This continued engagement of the hold down element 61 is caused by the action of the spring 78 which exerts its downward bias on the outer shaft 50 to which the hold down element 61 is attached. The hold down action continues until the inner shaft shoulder 72d comes into engagement with the underside of the outer shaft stop 50b during the upward movement of the inner shaft (see FIGURE 8) whereupon further upward movement of the inner shaft 72 (as occurs by the movement of its roller 33 along the terminal portion of the upwardly inclined cam track segment) causes a positive lifting of the outer shaft 50 and, thus, of the lid hold down element 61.

However, it is conceivable that the sealing disc element 62 may at times stick to the lid 35, perhaps due to too much heat, or heat being applied for too long a time during the sealing operation as might happen were the machine to be stopped while the containers are in the machine, or for other reasons. In such event, it is apparent that the bias pressure of the spring 78 may not be sufficient to hold down the container 24 to assure disengagement of the sealing disc element 62 from the lid 35 but, rather, the upwardly moving inner shaft 72 might tend to lift the container 24, together with the outer shaft 50 and the hold down element 61, against the bias of the spring 78.

To insure against this circumstance, the outer shaft 50 mounts a "stripper" or "knock out" roller which engages the cam track 88a at the underside of a fixed cam 88 only during that time interval when separation of the sealing disc element 61 from the lid 35 is intended. The cam 88 is located such that its cam track 88a is at the elevation of the uppermost surface generating element of the roller 86 during the sealing period, i.e., while the roller 33 is moving along the lowermost straight length portion of the cam track 32b at the rearward side of the machine. The cam track 88a has uniform elevation and extends arcuately, along the path of the roller 86, towards the front of the machine from an annular location corresponding with the location of juncture between the lowermost straight length portion and the 60° upwardly inclined portion of the cam track 32b. Its length is that which is equal to, or shorter than, the length of the base of a right triangle having altitude equal to the normal distance of separation of the outer shaft stop 50b and the inner shaft shoulder 72d (see FIGURE 7) during the sealing period. It is therefore seen that, by its length and location, the cam 88 assures that the container 24 will not be lifted during the separation of the sealing element 62 and the lid 35 as the roller 33 initiates its climb of the upwardly inclined portion of the cam track 32b.

Thus, during lift off, upward curling or other distortion of the lid 35 as might otherwise occur due to the heating of the outer closure 35a, or due to "hanging up" of the sealing element 62 on the lid, is prevented. It has been found that such continued holding down of the lid 35 against the beaded mouth rim 45 of the receptacle part 36, even for a relatively brief period of time after cessation of heat transmission through the lid, preserves the lid 35 in its desired undistorted shape and probably achieves a better adhesive seal between the lid and receptacle part than would otherwise be attained.

As the roller 33 climbs the upwardly inclined portion of the cam track 32b, the inner shaft shoulder 72d eventually contacts the underside of the outer shaft stop 50b (see FIGURE 7), whereupon the shaft 50 is raised and, thus, the lid hold down element 61 is lifted out of engagement with the lid 35. Of course, at this time the roller 86 has moved out from under the relatively short length cam 88 thus avoiding jamming of the machine. Further upward movement of the roller 33 along the terminal portion of the incline lifts the entire sealing head 34 a short distance above the container 24 to permit discharge of the now fully sealed container from the machine. Discharge of the container occurs as the rotating receptacle transport star wheel 28 moves the container into the rotating outfeed star wheel 26, as is conventional.

Referring now to FIGURE 9, a modified form of machine in accordance with the invention is generally indicated by reference numeral 100. Its general overall arrangement is similar to the machine 20 of FIGURES 1 and 2 so that, without a plan view showing thereof or the inclusion of certain details in FIGURE 9, it will be understood that the machine 100 is a rotating turret type machine which receives the capped but unsealed container assemblies 24 from a conveyor 103 mounted along the front edge of the machine, and that the base frame 101 of the machine mounts suitable rotating infeed and outfeed starwheel apparatus 125, 126 similar to the starwheels 25 and 26, and suitable fixed guide apparatus 129, 130, 131 similar to the guides 29, 30 and 31 of the FIGURE 1 embodiment, for the purpose of guiding the containers 24 on to the respective container support plates 108 (FIGURES 10–12) which revolve about the vertical central axis of the machine during operation. It will be further understood that the conveyor 103 is driven in the direction illustrated by the arrows in FIGURE 9 by mechanisms (not illustrated) within the base frame 101, and that its speed is in timed relation with the speed of rotation of the infeed and outfeed starwheels 125, 126 for the purpose of moving the respective containers 24 smoothly into and out from the machine.

The base frame 101 also mounts a cam 132 having a cam track 132a which guides the cam follower rollers 109 and determines the vertical movement of the container transport heads, generally indicated by reference numeral 110, during machine rotation. The cam 132 is mounted in fixed position on the base frame 101, as by the bolts and spacers which are generally indicated by reference numeral 111. The cam 132 is circular in shape and, as indicated by the full and dotted line showing in FIGURE 9, its cam track 132a includes a lower elevation straight length portion at the front of the machine which extends substantially 150° in arcuate length from the quadrant location illustrated at the right hand side of FIGURE 9 to the start of an upwardly inclined portion of the track as indicated at the left hand side of FIGURE 9. The remainder of the cam track 132a is formed by the referred to upwardly inclined portion which extends substantially 30° in arcuate length; an elevated straight length portion extending substantially 150° in arcuate length at the rearward side of the machine and as indicated by the full line showing in FIGURE 9; and a downwardly inclined portion extending approximately 30° in arcuate length which completes the cam pattern. The cam 132 further includes an upper guide 132b for guiding the rollers 109 in their downward movement along the downwardly inclined portion of the track, the guide 132b being attached in fixed, vertically spaced relation with respect to the cam track 132a, as by the spacer support 112 and bolts 113. Thus, as the container transport heads 110 revolve about the central axis of the machine during machine operation, the container support plates 108 which are carried thereby are lowered to the elevation of the conveyor 103 for receiving and discharging the respective containers 24 at the front side of the machine 100.

Although only two container transport heads 110 are illustrated in FIGURE 9, it will be understood that any desired number thereof may be carried by the machine, the same being disposed in annular spaced apart relation with respect to each other. In a preferred embodiment, the machine carries twelve such heads 110.

The machine 100 includes a vertical central shaft 127 (herein referred to as an inner shaft) which is mounted for rotation on bearings 154, 155 adjacent its respective opposite ends. The shaft 127 is driven in its rotatable movement by drive mechanisms, generally indicated by reference numeral 156, within the base frame 101 of the machine. The bearing 155 is mounted as shown on the top plate 102 of the base frame, and the bearing 154 is mounted as shown on an upper frame plate 104 which is a part of the upper frame of the machine formed by the vertical supports 105 to which the plate 104 is attached, as by bolts 106 and gussets 107. At their lower ends, the vertical supports 105 are respectively attached to the base frame 101, as by bolts 114.

The container transport heads 110 are mounted on an annular and horizontally extending head support plate 116 which, as more clearly shown in FIGURE 12, is in turn attached, as by bolts 115, to the radially outward extending flange 117 of the shaft 127 for rotation with the latter. Each head 110 includes an elongated body portion 119 which is mounted for vertical slidable movement within a tubular shaped mounting bracket 118 of the support plate 116. The mounting bracket 118 has a collar 118a which is press fit on to its upper end to serve as a flange which, in turn, is attached to the underside of the support plate 116 as by the bolts 118b (FIGURE 9). Thus, each mounting bracket 118 depends from the underside of the support plate 116 and provides a slidable bearing support for the body portion 119 and provides the container transport head, the latter passing upwardly through the support plate 116 as shown in FIGURE 12. The tubular bracket members 118 are vertically slotted at their inwardly facing sides, as at 118c, for vertical movement with respect thereto of the roller shaft 120 which mounts the cam follower roller 109 of the head 110, the roller shaft 120 being attached to the vertically slidable body portion 119 of the head 110 as shown.

Referring further to the details of each container transport head 110, the container support plate 108 thereof is mounted for vertical slidable movement at the upper end of the body portion 119 as indicated in FIGURE 12. This connection is made via the tubular sleeve 108a which is attached to and depends from the underside of the plate 108, and which has vertical slots 108b therein so that the sleeve 108a has limited vertical slidable movement with respect to the pin 121 which passes through the slots 108b and the body portion 119 of the head 110 to secure the connection. Further, the upper end of the body portion 119 has a vertical bore 122 for mounting of a spring 181 between the body 119 and the plate 108. The spring 181 biases the plate 108 in upward direction and functions in manner similar to the spring 81 of the machine 20 as previously described. That is, the spring 181 is determinative of the sealing pressure exerted on a container lid 35 during the sealing operation and, in one operable form of the invention, exerts a bias force of about 78 pounds. It will be noted that the pin 121 is removable so that the plate 108 may be removed, either for replacing the same with a different diameter plate or for replacing the spring 181 with a spring of different tension.

Referring now to the details of the individual sealing heads each of which is generally indicated by reference numeral 134, each is disposed above and in alignment with the respective container transport heads 110. The sealing heads 134 revolve concurrently with the container transport heads, the sealing heads being mounted on a sealing head support plate 152 which is attached, as by bolts 153, to a flange portion 157a of an outer shaft 157 of the machine which rotates with the shaft 127, but which is longitudinally slidable with respect thereto for adjustment as will be subsequently explained. It should be noted that the flange portion 157a actually takes the form of a collar which is welded or otherwise secured to the outer shaft 157, although other construction might be used. As seen in FIGURE 12, each sealing head 134 extends through an aperture 152a of the support plate 152, and comprises an inner shaft 172 and an outer shaft 150 which are vertically slidable relative to each other. A handwheel 173 is attached in fixed relation with respect to the outer shaft 150 at its upper end, as by a set screw 174, and at the lower end of the outer shaft 150 a threaded connection 175 is made with a sealing disc element 162 as shown. The generally cylindrical shaped sealing disc element 162 is made of aluminum and includes an upwardly projecting collar 162c having internal threads for making the threaded connection 175, the outer surface of the collar 162c being slidable within a vertically extending bore 169a of an aluminum heater block 169 which will subsequently be more fully described. It becomes apparent that the sealing disc element 162 may be brought into tight fitting engagement with the underside of the heater block 169 by manually twisting the handwheel 173 of the outer shaft 150 to tighten the threaded connection 175. In this manner a heat conductive connection is made between the sealing disc element 162 and the heater block 169 at the interface 162d therebetween.

The inner shaft 172 is slidably mounted within the central bore of the outer shaft 150. At its lower end the inner shaft 172 has a spring retaining collar 176 attached, as by a pin 177, for the purpose of retaining the lid hold down spring 178. The spring 178 is a coil spring which extends around the inner shaft 172 within a widened bore portion at the lower end of the outer shaft 150 as shown. Thus, the upper end of the spring 178 seats against an interior shoulder 150a of the outer shaft 150, and its lower end seats against the spring retaining collar 176 of the inner shaft 172. The collar 176 fits within the widened bore portion at the lower end of the outer shaft 150 and it is therefore seen that it may be attached to the inner shaft 172 prior to assembly of the sealing head 134 on the sealing head support plate 152.

At its upper end the inner shaft 172 has a knockout knob 179 for a purpose as will be subsequently described, the same being removably attached in fixed position, as by a set screw 180. Since the knockout knob 179 is removable, it becomes apparent that the sealing head 134 may be assembled on the support plate 152 by first passing the outer shaft 150 down through the aperture 152a, permitting the lower flange surface 173a of the handwheel 173 to rest upon the upper surface of the plate 152, and then passing the inner shaft 172 upwardly through the central bore of the outer shaft 150 (the knob 179 having been removed, and the spring 178 having been positioned on the shaft 172 against the attached collar 176 thereof), and thereafter attaching the knob 179 to the upper end of the inner shaft 172. The sealing disc element 162 is then threaded onto the lower end of the outer shaft 150.

An annular shaped lid hold down element 161 is attached in vertically slidable peripheral relation with respect to the sealing disc element 162, the connection being made by a horizontal pin 163 which is attached to the hold down element 161 as by snap rings 164 at either side thereof. The pin 163 extends through a vertical slot 162b which has width corresponding to the diameter of the pin 163, and which extends across the diameter of the sealing disc element 162 as shown. It will be noted that the lower end of the sealing head inner shaft 172 engages the pin 163 and, due to the bias of spring 178, normally urges the pin 163 to the bottom of the slot 162b. The height of the slot 162b is such as to permit upward movement of the lid hold down element 161 a distance which is greater than, or at least equal to the overall height of a container lid 35. In this connection, and comparing the shape of the sealing surface at the lower end of the sealing disc 162 with that of the sealing disc 62 of the previously described embodiment of the invention, it will be noted that the sealing area 162a of the sealing disc 162 is conically tapered throughout its height and does not include a vertically extending cylindrical upper wall portion such as the wall portion 62b of the first embodiment, and therefore does not form a corresponding vertically extending wall portion in the lid 35 (see FIGURE 5) as will be formed by the sealing disc 62, although such alternative shape of the sealing area 162a might be used. It will also be noted that the upwardly recessed portion 161a of the lid hold down element 161 accommodates and surrounds the lid skirt 40, and the downwardly facing flat surface 161b will rest upon the top wall 39 of the container lid 35 during the sealing operation.

As in the first embodiment of the invention, the upwardly recessed portion 161a includes an interior surface which flares outwardly and downwardly for the purpose of assuring the centering of the container 24 wtih respect to the sealing head 134 when the two are brought into engagement. It will also be noted that, because the inner shaft collar 176 is slidable within the widened inner bore of the outer shaft 160 of the sealing head, the bringing of a container lid and the sealing head 134 into sealing engagement with each other will effect a lifting of the lid hold down element 161, and thereby a lifting of the inner shaft 172 of the sealing head against the bias of the spring 178 which, in one operable form of the invention, exerts a bias force of ten pounds in the downward direction. In this manner the lid hold down pressure exerted by the sealing head 134 is substantially uniform throughout all phases of the container sealing operation.

Continuing with the structural details of the lid sealing apparatus in the machine 100, the heater block 169 is attached to and depends from a plate 190 of hard type insulating material, the attachment being made by screws (not illustrated). The heater block 169 and it attached insulating plate 190 are ring-shaped elements which extend continuously about the central shafts 127 and 157 of the machine. They are held in position against the underside of the sealing head support plate 152, as shown, upon mounting and tightening of all of the plurality of annularly spaced apart sealing heads 134 of the machine, in the manner previously described, and it will be noted that the inner peripheral edge of the insulating plate 190 abuts against an outer edge of the flange portion 157a of the outer shaft 157 to thereby assure proper concentric positioning of the heater block 169. A rubber ring 191 surrounds the outer periphery of the insulating plate 190 and serves as a resilient support for the downwardly depending and peripherally extending heater shield plate 192 which is attached, as by the illustrated snap on attachment at its upper end, to the outer periphery of the sealing head support plate 152.

The continuously extending heater block 169 is heated to a uniform temperature throughout by a steel band type electrical heater 193 which extends continuously about the heater block 169, in a peripheral groove of the latter as illustrated. Electrical connections to the heater 193 are by means of electric wires 194 and a thermoswitch 196 (FIGURE 9) which pass through a radially extending bore of the heater block in direction towards the center of the machine. The thermoswitch 196 maintains uniform temperature in the heater 193, and consequently throughout the heater block 169. A peripherally extending rubber ring 195 (FIGURE 12) maintains the heater 193 in tight fitting relation with the heater block 169. A thermometer and temperature gauge 197 (FIGURE 9) extends into the heater block 169 to sense and indicate the temperature thereof.

The electric wires 194 from the heater 193 extend into the vertical inner shaft 127 of the machine via a radially extending opening 198 formed in the outer shaft 157, the wires 194 passing through a vertically extending slot 127a and downwardly through the hollow core 127b to the lower end of the shaft 127 where they are attached to appropriate terminals 200a of a collector ring 200, as illustrated in FIGURE 9. When the shafts 127 and 157 are rotating during machine operation, the collector ring 200 permits electrical contact with an electrical source (not shown) via the electrical brush holding device 201 which is attached to the machine base frame 101, as by the insulator type mounting 202.

Referring again to the overall arrangement of the machine 100, the vertically slidable outer shaft 157 is connected to the rotatable inner shaft 127 for rotation therewith by a cross pin 203 which is attached to the outer shaft 157 and extends through the vertical slot 127a of the inner shaft. Thus, the sealing head support plate 152 which is attached to the outer shaft flange portion 157a rotates with the shaft 127 during machine operation so that the sealing heads 134 revolve in alignment with the respective receptacle transport heads 110, the latter being mounted on the plate 116 which is also attached to and rotates with the shaft 127 as previously described.

As shown in FIGURES 1 and 12, a "stripper" or "knock-out" cam 188 is disposed in fixed position above the rotating sealing heads 134 at only one location along the arcuate path of travel of the latter. The cam 188 has relatively short length for a purpose as will be later described, but its fixed positioning is accomplished by its attachment to a cam bracket 204 which is sleeved about the rotating outer shaft 157. The bracket 204 is maintained in fixed position with respect to the machine frame by means of a vertically projecting stay shaft 205 (FIGURE 9) which is attached to the bracket 204, as by the bolt 206. The sleeve portion 204a of the bracket 204 includes a bushing element 207 within which the outer shaft 157 may rotate. Fixed relative positioning in the vertical direction between the bracket 204 and the outer shaft 157 is maintained by a bearing ring 209 attached, as by screws 210, to the upper end of the outer shaft 157. The sleeve portion 204a of the bracket 204 is thus confined between the ring 209 and the upper edge of the flange portion 157a of the outer shaft, although these latter elements will be rotating with respect to the fixed bracket 204.

To accommodate containers having different height, the elevation of the sealing heads 134 is subject to adjustment to vary the vertical spacing between their sealing disc elements 162 and the respective container support plates 108. This adjustment is made by means of a handwheel 211 at the top of the machine (FIGURE 9), the lower end housing 211a of the handwheel being in threaded engagement with a height adjustment shaft 212 disposed within the central bore 127b of the rotatable central shaft 127. The lower end of the height adjustment shaft 212 is attached to the pin 203 which, in turn, is attached to the outer shaft 157 as previously mentioned. The height adjustment shaft 212 is vertically slidable within the bore 127b, and it will be noted that the vertically extending slots 127a of the shaft 127 permit the relative vertical movement. Adjustment of the height adjustment shaft 212 with respect to the shaft 127 is achieved by turning the handwheel 211, whereupon the shaft 212 will move upwardly or downwardly by means of the threaded connection 212a between the handwheel and the shaft. The requisite relative fixed vertical positioning of the handwheel 211 with respect to the inner rotatable shaft 127 is maintained by the bearing connection 211b at the lower end of the handwheel housing 211a. The bearing connection 211b is formed by a retaining ring 213 (which is attached as by screws 214 to the lower end of the housing), the roller bearing 215, and the lock nut 216 at the upper end of the bearing 215, the lock nut being threaded on to the upper end of the shaft 127 as indicated by the threaded connection 216a. The bearing connection 211b facilitates rotative movement of the handwheel 211 when the height adjustment is being made, at which time the machine is preferably not operating so that the shaft 127 is in stationary position. However, it will be noted that during machine operation the handwheel 211 will rotate with the rotatable shaft 127 in view of the threaded connection 212a between the handwheel and the height adjustment shaft 212, and in view of the cross pin connection 203 between the height adjustment shaft and the outer shaft 157 which rotates with the shaft 127, as aforesaid. To prevent accidental height adjustment during machine rotation, a set screw 217, having a nylon tip 217a, is threaded into an aperture of the handwheel housing 211a. When height adjustment is to be made, the set screw 217 is loosened so that the height adjustment shaft 212 may move vertically relative to the handwheel 211. After the height adjustment has been made, the set screw 217 is tightened, whereupon its nylon tip will be brought into pressure engagement with the threaded portion of the height adjustment shaft 212 to firmly retain the shaft 212 and the handwheel 211 in fixed position relative to each other during subsequent machine operation.

The stay shaft 205, which extends upwardly through an aperture 104a in the top frame plate 104 of the machine, will move vertically during any height adjustment of the sealing head support apparatus as may be made upon turning the handwheel 211. A ring type rubber bushing 215 surrounds the stay shaft 205 to facilitate such vertical slidable movement, yet avoids looseness of fit of the shaft 205 and consequent looseness of positioning of the bracket 204 and cam 188 to which the shaft 205 is attached. To facilitate accurate vertical positioning of the sealing heads 134 with respect to the underlying container support plates 108 during height adjustment of the sealing heads, a sealing head height gauge is effectively formed by a gauge plate 216 which is attached to and projects radially outward from the upper end of the stay shaft 205, as shown in FIGURE 9. The length of the stay shaft 205 is such that the elevation of the underside of the gauge plate 216 above the top surface of the top frame plate 104 corresponds to the height of the container assembly 24 which the machine is intended to accommodate. Thus, by positioning a container 24 on the top frame plate 104 beneath the gauge plate 216, and upon height adjustment of the sealing head support apparatus such that the underside of the gauge plate 216 is in contact with the top of the thus positioned container 24, the height of the respective sealing heads 134 above the container support plates 108 is that which is proper for sealing such containers.

Proceeding now with a description of the manner of operation of the sealing machine 100, a heater switch (not illustrated) is turned on to cause electric current to flow through the heater 193. The current connection is via the brush holder 201 to the collector ring 200 and then to the heater 193 via the wiring 194. The thermoswitch 196 is adjusted to control the extent of heating, and the temperature of the heater block 169 may be visually determined from the temperature gauge 197. In this embodiment of the invention it will be noted that a single, annularly extending heater block 169 is employed to heat the sealing discs 162 of all of the sealing heads 134 to a uniform temperature which, under the same conditions as explained in connection with the previously described embodiment, is 290° F. The heat from the heater block 169 is transmitted to each of the sealing discs 162 since the latter are in firm contact engagement with the underside of the heater block at all times during the sealing operation, as previously explained.

During the warmup time the machine height may be adjusted to accommodate the particular container assembly 24 to be sealed. One of the containers with its lid 35 placed firmly thereon is positioned below the height gauge 216, the set screw 217 is loosened, and the handwheel 211 is turned, whereupon the gauge 216 will move up or down depending upon the direction of rotation of the handwheel. The turning of the handwheel 211 moves the height adjustment shaft 212 up or down relative to the inner rotatable shaft 127, the cross-pin 203 at the lower end of the adjustment shaft 212 riding within the inner shaft slot 127a, and it will be noted that the adjustment shaft 212 does not itself rotate. Rather, the shaft 212 is lifted or lowered on the threaded connection 212a between the shaft 212 and the handwheel 211. Because the cross-pin 203 is attached to the outer shaft 157 to which the sealing head support plate 152 is attached (via the outer shaft flange portion 157a), the sealing head 134 will move up or down commensurately with the shaft 212, the outer shaft 157 sliding on the inner shaft 127. Similarly, the stay-shaft 205 and height gauge 216 will move up or down because the bracket 204 to which the stay shaft is attached is sleeved around and remains in relative fixed position with respect to the outer shaft 157 and, in this connection, it will be noted that the stripper cam 188 will also remain in its same relative position with respect to the knobs 179 of the sealing heads. When the underside of the height gauge 216 engages the top of the container assembly 24, the spacing between all of the sealing heads 134 and the respective container transport heads 110 will be that which is necessary for proper sealing of the containers, and the adjustment is retained by tightening the set screw 217. It will be noted that neither the cam 132 nor any of the container transport heads 110 will be affected during the height adjustment.

Machine rotation and movement of the conveyor 103 is then commenced, and the container assemblies 24 are moved on to the conveyor from the left hand side as seen in FIGURE 9. The infeed and outfeed star wheels are, of course, rotating as previously explained. The single line of containers 24, with their lids 35 in place, is moved by the conveyor such that each container comes against the guide 129 as in the previously described embodiment, whereupon the infeed starwheel 125 transfers the container on to one of the container support plates 108 as the latter moves past the starwheel 125. At this time the plate 108 is as the same elevation as that of the conveyor 103 since the cam follower roller 109 of the transport head 110 on which the plate 108 is mounted is rolling along the lower elevation straight length portion (at the front of the machine) of the cam track 132a. The relative positions of the container 24, and its associated sealing head 134 and container transport head 110 at this time is illustrated by FIGURE 10.

Immediately after the container 24 has been positioned by the starwheel 125 on one of the plates 108, the cam follower roller 109 begins to ride up the inclined portion of the cam track 132a as indicated at the left hand side of FIGURE 9. The height of this inclined portion is slightly greater than that which is necessary to cause the container 24 to be lifted such that its lid 35 engages the sealing disc 162 of the associated sealing head in conforming relation. The reason for this will be apparent from a comparison of FIGURES 10 and 11. That is, the intended controlled sealing pressure is determined by the tension and amount of preloading of the spring 181 which lies between the container support plate 108 and the body portion 119 of the transport head 110, and to support the container against the sealing head virtually solely by the bias pressure of the spring 181 requires that the body portion 119 be moved upwardly such that it slides relative to the plate sleeve 108a, its cross-pin 121 sliding within the sleeve slot 108b. Thus, the plate 108 will be "floating" relative to the transport head body portion 119 when the roller 109 has achieved the elevation of the elevated straight length portion of the cam track 132a so that the respective containers 24 on all of the transport heads 110 will be urged upwardly into pressure engagement with their associated sealing disc elements 162 with uniform pressure as determined by the bias of the springs 181, this force being about 78 pounds in the embodiment being described. The relative positions of the container 24 and its associated sealing head 134 and transport head 110 when the roller 109 has achieved the top of the upwardly inclined portion of the cam track 132a is illustrated by FIGURE 11.

A comparison of FIGURES 10 and 11 also shows the manner of engagement of the lid hold down element with the container 24 as the transport head 110 is lifted to bring the container into the position of FIGURE 11, which is its position during the sealing operation as the roller 109 moves along the elevated straight length portion of the cam track 132a at the rearward side of the machine. That is, and referring first to FIGURE 10, the lid hold down element 161 is initially biased to a position below the sealing disc element 162 by the bias force of the spring 178 which, as previously stated, is 10 pounds. The cross pin 163 is situated at the bottom of the sealing disc slot 162b, it being normally urged to this position by the inner shaft 172 of the sealing head 134, the latter being biased downwardly by the spring 178. As the container transport head 110 is elevated, initial contact of the container with the sealing head occurs when the top wall 39 of the container lid 35 engages the downwardly facing flat surface 161b of the lid hold down element. As the container 24 is elevated to the sealing position as shown in FIGURE 11, the upward force exerted by the container lifts the lid hold down element 161 against the bias of the spring 178, the inner shaft 172 being free to move upwardly. Thus, the lid hold down force is always uniform in amount as determined by the downward force of the spring 178.

Transmission of sealing heat through the substantially vertical walls 37 and 47 of the inner and outer closures 35a, 35b (FIGURES 4 and 5) which form the lid 35, and the referred to pressures thereon, are maintained for about 4 seconds as the container 24 is carried along the rearward side of the machine 100 in the sealing condition of the elements as illustrated in FIGURE 11.

When the lid sealing is completed, the roller 109 of the container transport head 110 begins its movement along the downwwardly inclined portion of the cam track 132a until it again attains the lower elevation of the lower straight length portion of the track, as seen at the right hand side of FIGURE 9, the downward movement being guided by the upper guide 132b of the cam track. FIGURE 12 shows the relative positions of the container 24, sealing head 134 and container transport head 110 when the cam follower roller 109 has moved only part of the way down the incline such that the sealed container 24 has been lowered away from its engagement with the sealing disc 162, but the lid hold down element 161 is still in engagement with the lid top wall 39 as intended. The initial downward movement of the body portion 119 of the transport head 110 has permitted the plate 108 to move upwardly relative thereto in response to the bias of the spring 181 until the bottom of the plate sleeve slot 108b has engaged the underside of the cross pin 121, whereupon further downward movement of the body portion 119 lowers the container 24 away from its engagement with the sealing head. In the intermediate position shown by FIGURE 12, the container 24 has been disengaged and lowered a distance away from the sealing disc 162, but is still engaged by the lid hold down element 161, the latter having moved downwardly relative to the sealing disc 162 in response to the bias of the spring 178. In this manner, lid hold down pressure is maintained for a brief period of time subsequent to the release of lid sealing pressure.

However, under certain circumstances as previously mentioned it is possible that the container lid 35 might adhere to the sealing disc 162 so strongly that the ten-pound force exerted by the lid hold down spring 178 is not sufficient to strip the container lid therefrom at the time of the intended release. Therefore, to insure that the lid hold down element 161 moves downwardly to its position as shown in FIGURE 12 relative to the sealing disc 162 so as to positively disengage the container from the latter, the knob 179 at the top of the sealing head inner shaft 172 passes under the "stripper" or "knockout" cam 188 to positively depress the inner shaft 172 in the event the latter has not moved downwardly responsive to the normal urging of the spring 178. That is, if under the normal action of the spring 178 the container 24 is stripped from its engagement with the sealing disc 162 the knob 179 will be in its lowermost position and will pass under the fixed stripper cam 188 without substantial contact therewith but, if proper container release has not occurred, the knob 179 will contact the cam 188 and will be forced downwardly to effect the intended release. The cam 188 need have only relatively short length for the purpose, although the cam track at its underside should be arcuately curved in the vertical direction for smoothness of engagement of the knob 179 therewith. The location of the cam 188 along the arcuate path of travel of all of the sealing head knobs 179 is approximately midway along the length of the downwardly inclined portion of the cam track 132a, i.e., whereat the lid hold down element 161 is intended to have attained its lowered position as illustrated in FIGURE 12.

Further downward movement of the body portion 119 of the container transport head 110 from the intermediate position shown in FIGURE 12 lowers the sealed container 24 away from all engagement with the sealing head 134 and to the elevation of the conveyor 103. As the continued movement of the container support plate 108 brings the container against the fixed guide 129 (FIGURE 9), the rotating outfeed starwheel 126 transfers the container from the plate 108 on to the conveyor, whereupon the now fully sealed container is discharged from the machine towards the right hand side of FIGURE 9.

Thus, the invention has been described in connection with machine embodiments thereof which accomplish all of its objects.

What is claimed is:

1. A machine for sealing lids on to the respective of a plurality of receptacles on which said lids have been placed, comprising frame means; receptacle transport means mounted on said frame means for movement in horizontal direction; means for positioning the respective of said receptacles at predetermined spaced apart locations on said receptacle transport means; a plurality of lid sealing heads mounted on said frame means for movement contemporaneously with, and in the direction of said movement of said receptacle transport means, said sealing heads being disposed in vertically spaced relation above said receptacle transport means and laterally spaced apart from each other whereby each said sealing head is substantially in alignment with the respective of said locations on said receptacle transport means for engagement with the lid of one of said receptacles when the receptacle is positioned at said location therebelow during a sealing operation; each said sealing head comprising an inner shaft, an outer shaft in vertically slidable relation with respect to said inner shaft, a lid sealing disc mounted for vertical slidable movement on and adjacent the lower end of said inner shaft, spring means engaging said inner shaft and biasing said lid sealing disc towards the lower end of its said shaft, means on said lid sealing disc for heating the same, a lid hold down ring attached to the lower end of said outer shaft and being in peripheral surrounding relation with respect to said lid sealing disc, second spring means biasing said outer shaft downwardly with respect to said inner shaft whereby said lid hold down ring normally projects below said lid sealing disc, and cam follower means on said inner shaft; and cam track means in fixed position with respect to said frame means, said cam follower means of all of said sealing heads being in cam following engagement with said cam track means, and said cam track means having configuration providing vertical reciprocal movement of each of said sealing heads during and responsive to the first said movement thereof.

2. A machine according to claim 1 wherein the cam track provided by said cam track means comprises a lower straight track portion, an upper straight track portion and an inclined track portion connecting said lower straight track portion to said upper straight track portion in the direction of movement of said cam follower means during the first said movement of said sealing heads, whereby each sealing head engages the lid of said one receptacle thereunder when its said cam follower means engages said lower straight track portion and is out of engagement with said lid when its said cam follower means engages said upper straight track portion, and each said sealing head further comprises a second cam follower means on said outer shaft, said frame means having stripper cam track means positioned at a location along the path of said movement of said second cam follower means which corresponds to the location of said inclined track portion of the first said cam track means, the elevation of said stripper cam track means with respect to the elevation of said second cam follower means of each sealing head being such as to engage the latter only in the event said outer shaft fails to move downwardly with respect to said inner shaft responsive to the urging of said second spring means during the period of said engagement of the first said cam follower means of the sealing head with said inclined track portion.

3. A machine according to claim 2 wherein said machine further comprises a horizontally disposed sealing head support plate mounted for rotatable movement on said frame means, said receptacle transport means comprising rotatable plate means below said support plate, means mounting each said sealing head for vertical slidable movement through said support plate and whereby the sealing head is laterally supported by the support plate, each said sealing head being vertically supported by the engagement of its first said cam follower means with said first cam track means, means mounting the said first cam track means for adjustable vertical positioning of the same between frame locations above said support plate, and means attaching said stripper cam track means to said first cam track means for said adjustable movement therewith.

4. A machine for sealing lids on to the respective of a plurality of receptacles on which said lids have been placed, comprising frame means, receptacle transport means mounted on said frame means for movement in a generally horizontal direction, a continuously extending heater block mounted on said frame means in vertical spaced relation above said receptacle transport means and for movement contemporaneously with, and in said general direction of said movement of the receptacle transport means, and a plurality of lid sealing heads carried by said heater block, each said sealing head comprising a lid sealing disc in firm engagement with the underside of said heater block whereby the sealing disc is heated by the block and a lid hold down ring connected for vertical slidable movement on said lid sealing disc, and said sealing heads being laterally spaced apart from each other for respective engagement with the lids of said plurality of receptacles when the latter are respectively positioned therebelow on said receptacle transport means during machine operation.

5. A machine according to claim 4 wherein each said sealing head further comprises a shaft mounted for vertical slidable movement with respect to said lid sealing disc, spring means urging said shaft in downward direction, and connection means between said shaft and said lid hold down ring whereby the latter is normally urged by said shaft to a lower position thereof below said lid sealing disc, and said receptacle transport means comprises a plurality of receptacle support plates respectively disposed below and associated with each said lid sealing head, means providing vertical reciprocal movement of each said receptacle support plate independently of each other, and respective spring means disposed between each said receptacle support plate and said means providing said vertical movement thereof, each said receptacle support plate being mounted for limited vertical slidable movement with respect to said means providing vertical movement thereof and its said spring means biasing the support plate in upward direction.

6. A machine according to claim 5 wherein said receptacle transport means further comprises plate means mounted for movement in horizontal direction, and said means providing vertical reciprocal movement of each said receptacle support plate comprises a vertical shaft associated with each said support plate and mounted for vertical slidable movement on said plate means, each said receptacle support plate being mounted for vertical slidable movement on its said associated shaft and said respective spring means being disposed between said support plate and its said shaft, cam follower means on each said shaft, and cam track means including upper and lower track portions in fixed position with respect to said frame, each said cam follower means engaging said cam track means whereby said vertical reciprocal movement of each said receptacle support plate is imparted responsive to said movement of said horizontally movable plate means.

7. A machine according to claim 6 wherein said cam track means includes a downwardly inclined track portion between said upper and lower track portions, and said machine further comprises stripper cam track means mounted in relatively fixed position with respect to said frame means at a location above said heater block and in substantially vertical alignment with the location of said downwardly inclined track portion, said slidable shaft of each said sealing head projecting upwardly through and above said heater block for engagement with said stripper cam track means in the event said shaft fails to urge said lid hold down ring to its said lower position responsive to the urging of said spring means of the sealing head when said cam follower means, on said vertical shaft which mounts that receptacle transport plate which is associated with the sealing head, engages said downwardly inclined track portion.

8. A machine according to claim 7 wherein said machine further comprises height adjustment means for adjusting said vertical spacing of said heater block above said receptacle transport means, said stripper cam track means being mounted in relatively fixed relation with respect to, and for vertical adjustment with said heater block.

9. A machine according to claim 8 wherein said frame means includes horizontal platform means for positioning a receptacle thereon, and said height adjustment means includes projecting height gauge means disposed above said horizontal platform means whereby, when said gauge means is in contact with the top of said lid of the receptacle so positioned during a height adjustment operation, said vertical spacing of said heater block above said receptacle transport means is such that said machine is adapted for sealing lids on to receptacles having height equal to that of said positioned receptacle.

10. A machine according to claim 9 wherein said frame means includes an upper frame portion disposed above said stripper cam track means, said horizontal platform means being on said upper frame portion, and said projecting height gauge means comprises a vertically extending shaft attached to said stripper cam track means and projecting upwardly therefrom through said upper frame portion to an elevation above said horizontal platform means, and a laterally projecting element attached to said shaft substantially at said elevation thereof.

11. Apparatus for heat-sealing a lid on to a receptacle on which said lid has been placed, comprising a lid sealing element having a sealing surface for pressure engagement with said lid during a sealing operation, a lid hold-down element having an underside surface for hold-down engagement with said lid during said sealing operation, receptacle support means for positioning said receptacle in alignment with said lid sealing and hold-down elements for said engagement by the latter, means providing reciprocal movement between said lid sealing and hold-down elements and said receptacle support means thereby providing engagement and disengagement movement between said elements and said lid, mounting means mounting said lid sealing and hold-down elements for parallel reciprocal movement with respect to each other in the direction of the aforesaid reciprocal movement, said mounting means including bias means for biasing said lid hold-down element with respect to said lid sealing element to retain said engagement of the lid hold-down element with said lid during at least the initial portion of said disengagement movement whereby said lid sealing element moves relative to said hold-down element and is thereby the first of said elements to disengage said lid, means for heating said sealing surface of the lid sealing element, and means maintaining said lid hold-down element in substantially unheated condition.

12. Apparatus according to claim 11 wherein said sealing surface of the lid sealing element comprises a radially outward facing peripheral surface for applying substantially lateral-directed pressure to a radially inward-facing generally vertical wall portion of said lid during a sealing operation.

13. Apparatus according to claim 12 wherein said lid sealing element has slide means extending in the direction of said reciprocal movement and having a bottom terminus, said lid hodl-down element has slide follower means engaging said slide means to thereby mount said lid hold-down element on said lid sealing element, and said bias means comprises spring-biased shaft means urging said slide follower means to said bottom terminus of the slide means.

14. Apparatus according to claim 12 wherein said sealing surface of the lid sealing element comprises a radially inward tapered peripheral wall portion of said lid sealing element.

15. Apparatus according to claim 14 wherein said sealing surface of the lid sealing element further comprises a cylindrical peripheral wall portion adjacent said tapered wall portion.

16. Apparatus according to claim 15 wherein said lid hold-down element is peripherally and concentrically disposed with respect to said lid sealing element.

17. Apparatus according to claim 16 wherein said lid hold-down element further has radially outward flaring and inwardly facing surface means which project from its said underside surface for assuring axially aligned engagement between said lid sealing and hold-down elements and said lid during a lid sealing operation.

18. Apparatus according to claim 11 wherein said mounting means has means, including said bias means, for automatically positioning said lid hold-down element under-side surface with respect to said lid sealing element sealing surface when said lid hold-down and sealing elements are out of engagement with said lid, whereby said lid hold-down element underside surface engages said lid prior to said lid sealing element surface engaging said lid during said engagement movement between said elements and said lid.

19. Apparatus according to claim 18 wherein said mounting means further comprises first and second shaft means in slidable relation with each other and extending in the direction of said reciprocal movement, means mounting said lid hold-down element on one of said shafts, and means mounting said lid sealing element on the other of said shafts, said bias means comprising spring means mounted between said shafts and urging said one shaft with respect to said other shaft in direction towards said receptacle support means.

20. Apparatus according to claim 17 wherein said lid sealing element is mounted for slidable movement on its said shaft, and said mounting means further comprises first stop means on said sealing element shaft for limiting said slidable movement in the direction towards said receptacle support means, second stop means spaced away from the first said stop means, and second spring means extending between said second stop means and said lid sealing element and normally urging the latter against said first stop means, whereby the respective pressures of engagement between said lid hold-down and sealing elements and said lid are respectively determined by the first said spring means and said second spring means.

21. Apparatus according to claim 18 wherein said bias means comprises spring means urging said lid hold-down element with respect to said lid sealing element in direction towards said receptacle support means, and said receptacle support means includes spring means for urging said receptacle in direction towards said lid sealing and hold-down elements, whereby the respective pressures of engagement between said lid hold-down and sealing elements and said lid are respectively determined by the first and second said spring means.

References Cited

UNITED STATES PATENTS

| | | | |
|---|---|---|---|
| 2,699,281 | 1/1955 | Duke | 53—319 |
| 2,799,981 | 7/1957 | Baker-Carr | 53—39 |
| 3,060,652 | 10/1962 | Eckman | 53—42 |
| 3,163,973 | 1/1965 | St. Clair | 53—329 |
| 3,197,940 | 9/1965 | Spangler | 53—329 |
| 3,223,268 | 12/1965 | Whitchurch | 53—42 X |
| 3,224,163 | 12/1965 | Ray | 53—329 |
| 3,248,851 | 4/1966 | Ford | 53—373 |
| 3,261,144 | 7/1966 | Weber | 53—344 |

RICHARD H. EANES, JR., *Primary Examiner.*